(12) United States Patent
Okazaki et al.

(10) Patent No.: US 7,872,393 B2
(45) Date of Patent: Jan. 18, 2011

(54) AXIAL GAP TYPE SUPERCONDUCTING MOTOR

(75) Inventors: Toru Okazaki, Osaka (JP); Shingo Ohashi, Osaka (JP); Hidehiko Sugimoto, Fukui (JP); Toshio Takeda, Tokyo (JP)

(73) Assignees: Sumitomo Electric Industries, Ltd., Osaka (JP); Ishikawajima-Harima Heavy Industires Co., Ltd., Tokyo (JP)

( * ) Notice: Subject to any disclaimer, the term of this patent is extended or adjusted under 35 U.S.C. 154(b) by 314 days.

(21) Appl. No.: 11/793,677

(22) PCT Filed: Dec. 16, 2005

(86) PCT No.: PCT/JP2005/023124
§ 371 (c)(1),
(2), (4) Date: Sep. 24, 2007

(87) PCT Pub. No.: WO2006/068039
PCT Pub. Date: Jun. 29, 2006

(65) Prior Publication Data
US 2008/0039331 A1    Feb. 14, 2008

(30) Foreign Application Priority Data
Dec. 24, 2004  (JP)  ............ P.2004-374668
Nov. 29, 2005  (JP)  ............ P.2005-344689

(51) Int. Cl.
H02K 55/04  (2006.01)
H02K 16/00  (2006.01)
H02K 21/24  (2006.01)

(52) U.S. Cl. ............ 310/268; 310/156.35; 310/52; 505/166

(58) Field of Classification Search ............ 310/156.32, 310/156.35, 52, 268
See application file for complete search history.

(56) References Cited

U.S. PATENT DOCUMENTS
4,001,617 A * 1/1977 Boyer ............ 310/52
4,250,423 A * 2/1981 Linscott, Jr. ......... 310/216.124

(Continued)

FOREIGN PATENT DOCUMENTS
DE    4008912 A1   10/1990

(Continued)

OTHER PUBLICATIONS

Search Report issued by Canadian Intellectual Property Office dated Sep. 4, 2009 for Canadian Patent Application No. 2,592,161 (3 pages).

(Continued)

*Primary Examiner*—Burton Mullins
(74) *Attorney, Agent, or Firm*—Foley & Lardner LLP

(57) ABSTRACT

Stators 12 and 13 are disposed with required air gaps in an axial direction of a rotor 11 so as to face each other, a plurality of field bodies 15 or permanent magnets 33 are disposed in the rotor 11, and a plurality of armature coils 17 and 19 are disposed in the stators 12 and 13 around the axis. At least one of the field bodies 15 or permanent magnets 33 and the armature coils 17 and 19 are formed from a superconductive material such that their magnetic flux directions are directed to the axial direction.

16 Claims, 7 Drawing Sheets

U.S. PATENT DOCUMENTS

| | | | | |
|---|---|---|---|---|
| 4,358,693 A | * | 11/1982 | Palmer et al. | 310/46 |
| 4,578,610 A | * | 3/1986 | Kliman et al. | 310/156.35 |
| 5,057,726 A | * | 10/1991 | Mole et al. | 310/67 R |
| 5,177,054 A | * | 1/1993 | Lloyd et al. | 505/166 |
| 5,177,387 A | * | 1/1993 | McMichael et al. | 310/90.5 |
| 5,177,392 A | * | 1/1993 | Scott | 310/268 |
| 5,184,040 A | * | 2/1993 | Lim | 310/114 |
| 5,334,899 A | * | 8/1994 | Skybyk | 310/268 |
| 5,525,849 A | * | 6/1996 | Ito et al. | 310/90.5 |
| 5,581,135 A | | 12/1996 | Ito et al. | |
| 5,798,594 A | * | 8/1998 | Radovsky | 310/180 |
| 6,605,886 B2 | | 8/2003 | Laskaris | |
| 7,049,724 B2 | * | 5/2006 | Qu et al. | 310/180 |
| 7,291,958 B2 | * | 11/2007 | Dombrovski | 310/261.1 |
| 2003/0094880 A1 | * | 5/2003 | Hsu et al. | 310/266 |

FOREIGN PATENT DOCUMENTS

| | | |
|---|---|---|
| JP | 1-190256 A | 7/1989 |
| JP | 3-289344 A | 12/1991 |
| JP | 4-304159 A | 10/1992 |
| JP | 7-87724 A | 3/1995 |
| JP | 7-107720 | 4/1995 |
| JP | 7-312885 A | 11/1995 |
| JP | 7-320931 A | 12/1995 |
| JP | 2001-178112 A | 6/2001 |
| JP | 2004-23921 | 1/2004 |
| JP | 2004-140937 A | 5/2004 |
| JP | 2005-224001 A | 8/2005 |

OTHER PUBLICATIONS

Office Action mailed Jul. 24, 2009, received in corresponding Chinese application No. 200580044707.1, including English translation.
Chinese Office Action mailing date of Jul. 30, 2010 for Chinese Application No. 200580044707.1 with English translation (12 pgs).

* cited by examiner

AXIAL GAP TYPE SUPERCONDUCTING MOTOR

This is a U.S. National Stage application of PCT/JP2005/023124, filed Dec. 16, 2005, which claims priority to Japanese applications 2005-344689 filed Nov. 29, 2005 and 2004-374668 filed Dec. 24, 2004, the disclosures of all which are incorporated herein in their entirety by reference.

TECHNICAL FIELD

The present invention relates to an axial gap type superconducting motor, and more specifically, to a high-torque motor which is used as a driving source of cars and ships.

RELATED ART

Conventionally, there are provided a radial gap type motor and an axial gap type motor as motors. As the radial gap type, a motor in which a rotor provided in a hollow part of a stator having an annular cross-section such that the magnetic flux directions of coils are directed to a radial direction is widely and generally used. Meanwhile, the axial gap type motor, as disclosed in Japanese Unexamined Patent Application Publication No. 2004-140937, has stators disposed to face each other in the axial direction of a rotor such that the magnetic-flux directions of coils are directed to the axial direction.

In the conventional axial gap type motor, however, permanent magnets or coils such as copper wires are used for a magnetic field, and copper wires are used for armature coils. As clear from the fact that output torque is given as the product of a current and a magnetic field, there is a limit to motor output. Further, in order to increase output, the size of a motor inevitably increases so that the weight thereof increases. Further, if the amount of a current increases, the energy efficiency is lowered due to a copper loss or the like.

[Patent Document 1]
Unexamined Japanese Patent Application Publication No. 2004-140937

DISCLOSURE OF THE INVENTION

Problems to be Solved by the Invention

The invention is made in view of the above problems. It is therefore an object of the invention to provide an axial gap type motor which realizes high output, is small and lightweight, has high efficiency, and particularly, is suitably used as a propulsion motor for ships and the like.

Means for Solving the Problems

In order to solve the above problems, according to the invention, there is provided an axial gap type superconducting motor, including:
stators disposed with required air gaps in an axial direction of a rotor so as to face each other,
a plurality of field bodies disposed in any one of the rotor and the stators around the axis of the rotor,
a plurality of armature coils disposed in the other one around the axis, wherein
at least one of the field bodies and the armature coils are formed from a superconductive material such that the magnetic flux directions thereof are directed to the axial direction.

In such a configuration, a superconductive material is used for the magnetic field and/or armatures of the axial gap type motor. Thus, a large current can be applied, and the size and weight of the motor can be reduced while high-output motor torque is obtained. Further, by using the superconductive material, an energy loss can be significantly reduced without a copper loss, which makes it possible to realize high efficiency. Further, since the stators are disposed in the axial direction of the rotor as the axial gap type structure, the diameter can be reduced so that noises caused by rotation can be reduced. In the axial gap type motor, coil ends which do not contribute to motor torque is not formed unlike a radial gap type motor. Thus, it is possible to obtain a high-efficiency and high-output motor.

Preferably, the field bodies are field coils, and both of the field coils and the armature coils are formed from a superconductive material.

As the superconductive material, a bismuth-based or yttrium-based high-temperature superconductive material is suitably used.

Further, the superconductive material may be formed in clumps like a high-temperature superconductive bulk magnet or a permanent magnet. The high-temperature superconductive bulk magnet is a magnet that is made of a high-temperature superconductive ingot obtained by dispersing a non-superconductive phase in an RE—Ba—Cu—O high-temperature superconductor to make the phase melt and grow, and that is capable of trapping and magnetizing a larger magnetic field than a high-performance permanent magnet.

Further, the field bodies may be permanent magnets made of materials other than a superconductive material, and the armature coils may be formed from a superconductive material.

If this configuration is adopted, the permanent magnets may be simply disposed in any one of the rotor and the stators. Therefore, the manufacturing efficiency of the axial gap type superconducting motor can be enhanced, which makes it possible to simplify the structure.

Further, although permanent magnets made of materials other than a superconductive material are used as the field bodies, it is possible to sufficiently cope with any situation, if the output of the superconducting motor is 1 kW to 5 MW. As a result, it is possible to reduce the size of the axial gap type superconducting motor.

Preferably, the stator are disposed on both sides of the rotor in the axial direction of the rotor, a rotary shaft fixed to the rotor is hung so as to pass through bearings of the stators, and the field bodies and the armature coils are disposed on the same axis with air gaps in the axial direction.

If this configuration is adopted, a pair of stators are provided on both sides of the rotor in the axial direction, with an air gap therebetween. Thus, compared with when a stator is disposed only on one side, the magnetic field to the rotor is strengthened, which makes it possible to obtain high-output motor torque.

Preferably, flux collectors of magnetic bodies are disposed in hollow parts of field coils serving as the field bodies and/or the armature coils.

If this configuration is adopted, as magnetic bodies are provided in the coil hollow parts, the magnetic fluxes of the coils can be strengthened, which makes it possible to realize a high-output motor. Further, as the motor has high output, the number of wound coils can be lessened so that the size and weight of the motor can be further reduced. Further, the flux collectors fulfill a role of forming a magnetic path of magnetic flux to be generated in the coils. Therefore, the magnetic flux direction can be specified, and a leakage magnetic field can be prevented from being generated in a direction where the magnetic flux does not contribute to torque. Further, the magnetic bodies are buried in the coil hollow parts, thereby enhancing the mechanical strength of the coils.

Preferably, the leading ends of the flux collectors are set in the same position as the leading end surfaces of the coils where the flux collectors are disposed or in positions which recede from the leading end surfaces of the coils.

Particularly when permanent magnets or superconductive bulk magnets are provided on the facing counterpart side, the flux collectors do not project from the leading end surfaces of the coils surrounding the flux collectors. In this case, an attraction force caused by a magnetic force is hardly generated between the magnets and the facing counterpart side, during assembling, etc. Further, the collision between the rotor and the stators does not occur. Therefore, positioning is easily performed while a gap is maintained at a set distance.

However, the flux collectors may be provided to project from the leading end surfaces of the coils in which the flux collectors are disposed. In this case, the gap between the collectors and the facing counterpart side (the rotor or the stators) can be reduced. Thus, the magnetic flux between the rotor and the stators can be strengthened, which leads to an improvement in output torque.

Preferably, the stators and/or the rotor is/are formed from a magnetic body.

If this configuration is adopted, the stators and/or the rotor fulfills a role as a yoke, and a magnetic flux passing therethrough can be shielded from leaking to the rear side thereof. Therefore, a magnetic field is strengthened, which makes it possible to realize high-output torque.

Preferably, a material having high magnetic flux density/ high magnetic permeability is used for the magnetic body.

High flux density means a flux density where saturated flux density is 0.5 to 10 telsa. Preferably, the flux density may be set to 1.5 to 4 telsa.

Further, a material having high magnetic permeability means a material the specific magnetic permeability of which is 500 to 10000000. Preferably, the specific magnetic permeability may be set to 2000 to 10000.

Particularly, it is more preferable that a material having high magnetic flux density/high magnetic permeability is permendur.

Permendur has a magnetic permeability about ten times larger than that of iron, and the magnetic-field saturation thereof is more than 2 telsa. Therefore, a current to be supplied to the coils can generate at least a large magnetic field such that motor output can be increased, and the size of the motor can be reduced. However, as the magnetic body, silicon steel, iron, permalloy and the like may be used.

Preferably, air gaps are provided in the hollow parts of the armature coils, or non-magnetic bodies are disposed in the hollow parts.

Further, preferably, air gaps are provided in the hollow parts of the field coils, or non-magnetic bodies are disposed in the hollow parts.

Particularly when permanent magnets or superconductive bulk magnets are provided on the facing counterpart side, magnetic bodies are not present in the hollow parts of the coils. In this case, an attraction fore caused by a magnetic force is not generated between the magnets and the facing counterpart side, during assembling, etc. Therefore, positioning can be easily performed while the gap between the rotor and the stators is maintained at a set distance.

Further, as air gaps are provided in the coil hollow parts or light non-magnetic bodies are disposed in the coil hollow parts, it is possible to reduce the weight of the motor. Particularly, if air gaps are provided in the coil hollow parts of the rotor or light non-magnetic bodies such as resin are disposed in the coil hollow parts, the weight of the motor can be reduced so that an inertia force during rotation is reduced. Further, responsiveness to a change in rotational speed improves.

In addition, as the light non-magnetic bodies to be disposed in the coil hollow parts, resin, FRP, aluminum and the like may be exemplified.

As a refrigerant supply means for cooling a superconductive material for forming the field bodies and/or the armature coils, when the superconductive material is attached to the rotor side, it is preferable that a flow passage for refrigerant including liquid nitrogen or the like is provided inside a rotary shaft fixed to the rotor so as to pass through the center of the rotor. Meanwhile, when the superconductive material is attached to the stator side, it is preferable that a flow passage for refrigerant including liquid nitrogen or the like is provided in each attaching position of the superconductive material in the stator. In any case, it is preferable that the refrigerant flow passage is coated with a heat-insulating layer up to a position where the refrigerant approaches the disposed position of the superconductive material serving as the magnetic flux bodies or the armature coils.

Effects of the Invention

As clear from the above description, according to the invention, a superconductive material is used for the field bodies and/or the armature coils of the axial gap type motor. Thus, a large current can be applied with high efficiency, without a copper loss. Further, high-output motor torque can be obtained, and the size and weight of the motor can be reduced. Further, since the stators are disposed in the axial direction of the rotor as the axial gap type structure, the size of the motor can be reduced, and noises caused by rotation can also be reduced.

In addition, the flux collectors of magnetic bodies are disposed in the coil hollow parts. Therefore, the magnetic flux of the coils can be strengthened, which makes it possible to realize a high-output motor. Further, the size and weight of the motor can be reduced. Providing flux collectors contributes to specification of the magnetic flux directions, and a reduction in leakage magnetic flux.

REFERENCE NUMERALS

10: AXIAL GAP TYPE SUPERCONDUCTING MOTOR
11: ROTOR
12, 13: STATOR
14: ROTARY SHAFT
15: FIELD COIL (FIELD BODY)
16, 18, 20: FLUX COLLECTOR
17, 19: ARMATURE COIL
21: LIQUID HYDROGEN TANK
33: PERMANENT MAGNET (FIELD BODY)
S: SPACE

BEST MODE FOR CARRYING OUT THE INVENTION

Hereinafter, embodiments of the invention will be described with reference to the drawings.

Figure 1:
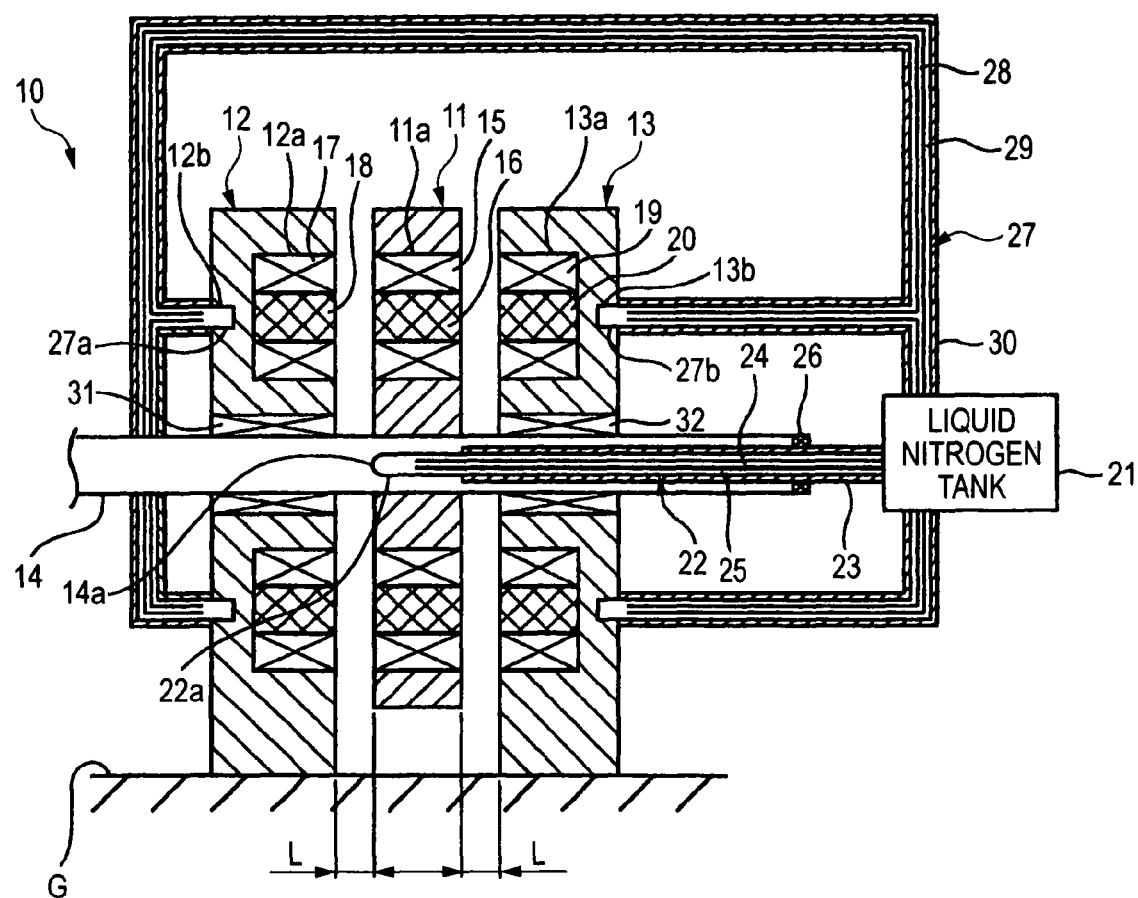
FIG. 1 is a sectional view of an axial gap type superconducting motor according to a first embodiment of the invention.
Figure 2:
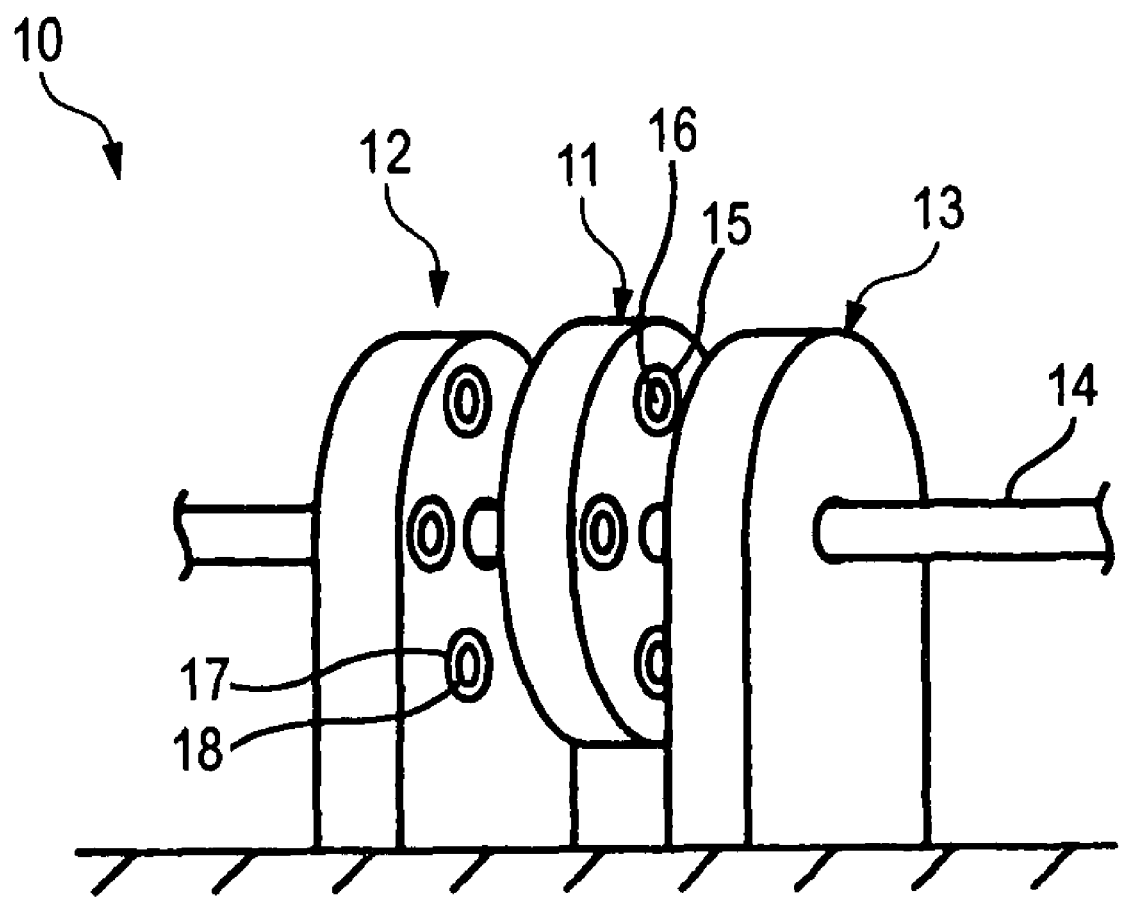
FIG. 2 is a perspective view of the axial gap type superconducting motor according to the first embodiment.

FIGS. 1 and 2 show an axial gap type superconducting motor 10 according to a first embodiment of the invention. The axial gap type superconducting motor 10 has a pair of stators 12 and 13 disposed to face each other on both sides of a rotor 11 in an axial direction of the rotor 11 fixed to a rotary shaft 14. The rotary shaft 14 fixed to the rotor 11 is hung so as to pass through bearings 31 and 32 of the stators 12 and 13.

The rotor 11 is formed in a disk shape, and the rotary shaft 14 is fixed to the rotor 11 so as to pass through the center thereof. The rotor 11 has a plurality of coil attachment holes 11a, which are provided at regular intervals in a peripheral direction on the outer peripheral side thereof, and a plurality of field coils 15 buried in the coil attachment holes 11a, the field coils 15 being made of a superconductive material. As such, the plurality of field coils 15 are attached at regular intervals in a peripheral direction around the axis of the rotor such that the magnetic-flux directions of the respective field coils 15 are directed to the axial direction. In a hollow part of each of the field coils 16, a flux collector (magnetic body) 16 made of permendur is disposed. Any one of the flux collectors 16 and the field coils 15 is not made to project from both side surfaces of the rotor 11.

As a material for the rotor 11, a magnetic material such as permendur, silicon steel, iron, or permalloy, is used. Further, as a superconductive material for forming the field coils 15, a bismuth-based or yttrium-based superconductive material is used. These field coils 15 are configured so as to be supplied with required power from a power source (not shown).

The stators 12 and 13 have mutually symmetrical shapes. The stators 12 and 13 fixed to a ground surface G have a plurality of coil attaching concave parts 12a and 13a provided in the surfaces thereof facing the rotor 11. The plurality of coil attaching concave parts 12a and 13a are provided at regular intervals in the peripheral direction on the outer peripheral side such that a plurality of armature coils 17 and 19 made of a superconductive material are buried in the coil attaching concave parts 12a and 13a. As such, the plurality of armature coils 17 and 19 are attached at intervals in the peripheral direction around the axis such that their magnetic flux directions are directed to the axial direction. In hollow parts of the respective armature coils 17 and 19, flux collectors (magnetic body) 18 and 20 made of permendur are disposed. Any one of the flux collectors 18 and 20 and the armature coils 17 and 19 are not made to project from the side surfaces of the stators 12 and 13, respectively. The armature coils 17 and 19 are configured so as to be supplied with required power from a power source (not shown).

As a material for the stators 12 and 13, a magnetic material, such as permendur, silicon steel, iron, or permalloy, is used so as to fulfill a role as a back yoke. Further, as a superconductive material for forming the armature coils 17 and 19, bismuth-based or yttrium-based superconductive material is used.

The armature coils 17 and 19 and the field coils 15 are positioned so that the radial distances from the shaft center of the rotary shaft 14 to the respective coils coincide with each other. Further, the distance between a rotating end surface of the rotor 11 and the end surface of the stator 12 or 13 on the side of the rotor is set to 0.1 mm to 1 mm (0.5 mm in this embodiment) as a gap.

Since the field coils 15 are formed from a superconductive material, liquid nitrogen stored in a liquid nitrogen tank 21 is introduced into a hollow part 14a of the rotary shaft 14 so as to cool down the field coils 15.

More specifically, the rotary shaft 14 has the hollow part 14a provided to extend to the disposed position of the rotor 11, the hollow part being opened towards one end of the rotary shaft in the axial direction. A pipe 22 is inserted into the hollow part 14a through a bearing 26 from the liquid hydrogen tank 21 so as to be terminated immediately before the disposed position of the rotor. The pipe 22 has a double-tube structure, including an inner peripheral flow passage 24 serving as an outgoing passage and an outer peripheral flow passage 25 serving as an incoming passage, such that liquid nitrogen flowing through the inner peripheral flow passage 24 at a leading end of the pipe is moved and circulated to the peripheral flow passage 25. The pipe 22 has a vacuum heat-insulating layer 23 provided on the outer peripheral surface thereof except for a position corresponding to the rotor 11.

Since the armature coils 17 and 19 are also formed from a superconductive material, liquid nitrogen stored in the liquid nitrogen tank 21 is used to cool down the armature coils 17 and 19.

More specifically, a double-tube pipe 27 is derived from the liquid hydrogen tank 21, the pipe 27 having an inner peripheral flow passage 28 serving as an outgoing passage and an outer peripheral flow passage 29 serving as an incoming passage. In such a structure, liquid nitrogen flowing through the inner peripheral flow passage 28 at the leading end of the pipe is moved and circulated to the peripheral flow passage 29. The pipe 27 is bifurcated into the rear side of the stator 12 and the rear side of the stator 13 such that the bifurcated pipes 27 extend to the central positions of the attaching parts of the field coils 17 and 19 of the respective stators 12 and 13. The leading ends of the bifurcated pipes 27 communicate with refrigerant introducing holes 12b and 13b concaved in the rear sides of the stators 12 and 13, respectively, so as to introduce the refrigerant. The refrigerant introducing holes 12b and 13b are disposed in positions corresponding to the field coils 17 and 19, respectively. The pipe 27 has a vacuum heat-insulating layer 30 provided on the outer peripheral surface of the pipe 27 except for portions which are fitted into the refrigerant introducing holes 12b and 13b of the stators 12 and 13.

According to the axial gap type superconducting motor 10 configured in such a manner, the field coils 15 are formed from a superconductive material. Thus, it is possible to apply a large current with high efficiency, without a copper loss, etc. As a result, it is possible to realize high-output motor torque and to reduce size and weight. Further, as an axial gap structure, the stators 12 and 13 are disposed in the axial direction of the rotor 11. Therefore, the diameter can be reduced, and rotation noises can also be reduced. Further, since the stators 12 and 13 are disposed on both sides of the rotor 11, a magnetic field can be strengthened, which makes it possible to realize higher output. In addition, a magnetic material is used for the stators 12 and 13 to serve as back yokes such that generation of a leakage magnetic field is prevented. Thus, a magnetic field is further strengthened, which makes it possible to realize high-output torque. Further, in the hollow parts of the field coils 15 and the armature coils 17 and 19, magnetic bodies (permendur) are provided as the flux collectors 16, 18, and 20. Thus, a magnetic field is strengthened, which makes it possible to realize high output.

In addition, in this embodiment, the field coils 15 of the rotor 11 and the armature coils 17 and 19 of the stators 12 and 13 are formed from a superconductive material. However, only one of them is formed from a superconductive material, and the other one may be formed from a normal conductive material. In this case, the distance between the rotating end surface of the rotor 11 and the end surfaces of the stators 12 and 13 on the side of the rotor may be set to 1 mm to 20 mm. That is, a gap may be provided therebetween.

Further, the stators 12 and 13 and the flux collectors 18 and 20 are separately formed. However, when the stators 12 and 13 and the flux collectors 18 and 20 are formed from the same material, they may be integrally formed. As the refrigerant, liquid neon, liquid helium or the like can be used, in addition to the liquid nitrogen.

Next, a second embodiment of the invention will be described.

Figure 3:
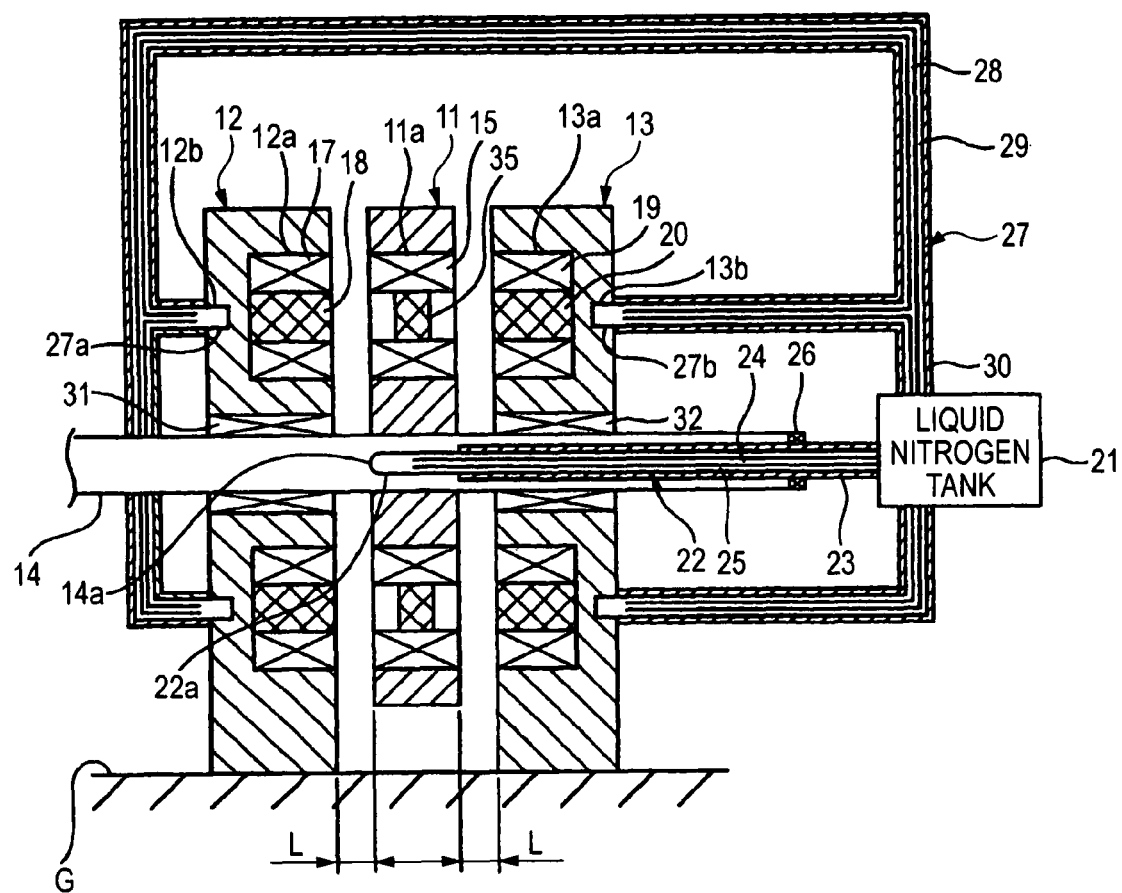
FIG. 3 is a sectional view of an axial gap type superconducting motor according to a second embodiment of the invention.

As shown in FIG. 3, a difference from the first embodiment is that flux collectors 35 disposed in hollow parts of the field coils 15 of the rotor 11 are buried so as not to project from the end surfaces of the field coils 15.

If this configuration is adopted, the flux collectors 35 do not project from the leading end surfaces of the field coils 15. Thus, an attraction force caused by a magnetic force is hardly generated between the stators 12 and 13 during assembling, etc. Further, any collision between the rotor 11 and the stators 12 or 13 does not occur. Therefore, positioning is easily performed while a gap is maintained at a set distance.

Next, a third embodiment of the invention will be described.

Figure 4:
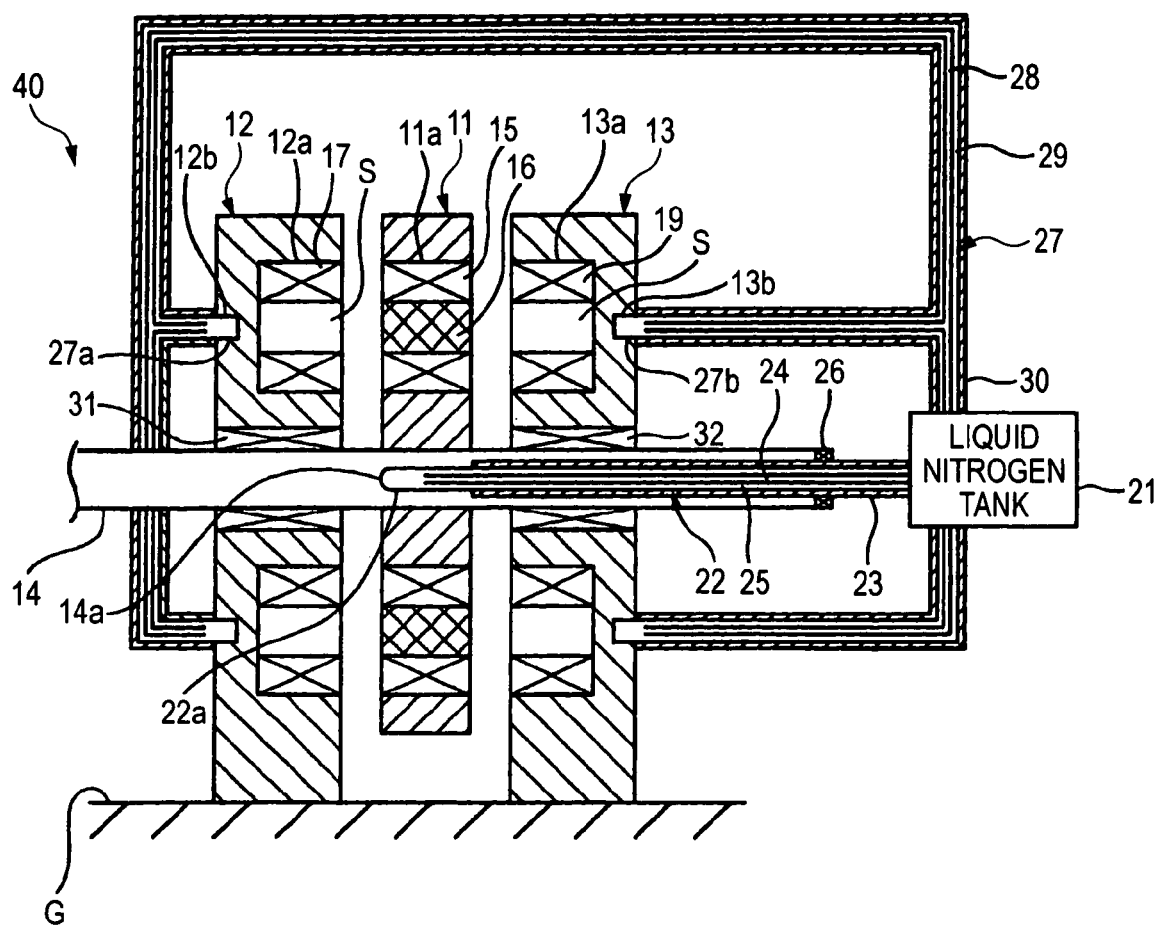
FIG. 4 is a sectional view of an axial gap type superconducting motor according to a third embodiment of the invention.

As shown in FIG. 4, a difference from the first embodiment is that air gaps S are provided in the hollow parts of the armature coils 17 and 19 of the stators 12 and 13.

If this configuration is adopted, magnetic bodies are not present in the hollow parts of the armature coils 17 and 19 facing the flux collectors 16 of the rotor 11, and an attraction force caused by a magnetic force between field bodies is not generated during assembling, etc. Thus, positioning can be easily performed while the gap between the rotor 11 and the stators 12 or 13 is maintained at a set distance.

Figure 5:
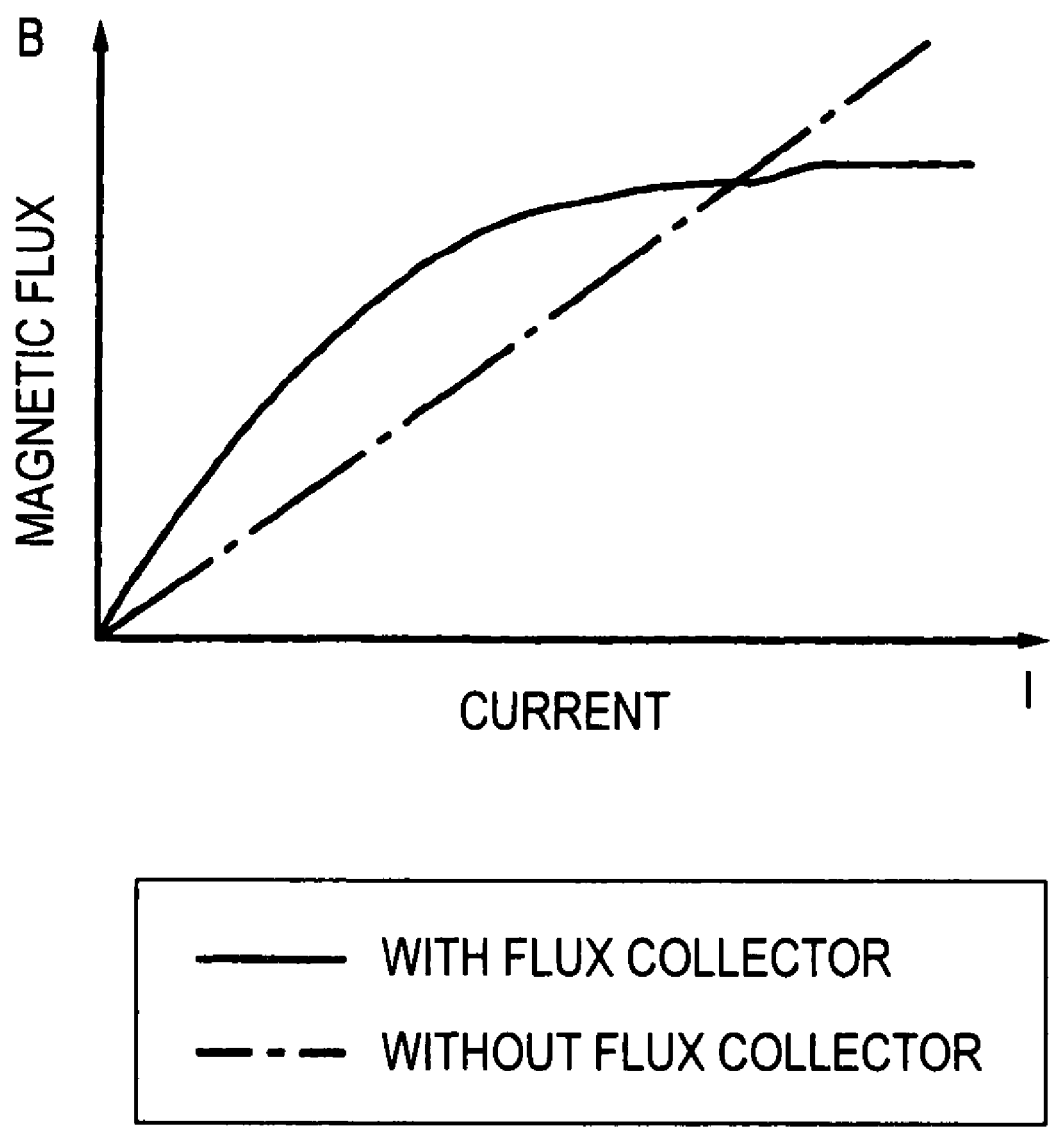
FIG. 5 is a graph showing the relationship between coil currents and magnetic fluxes.

In general, when flux collectors are disposed in hollow parts of coils, a magnetic field is strengthened. As shown in FIG. 5, however, a magnetic flux does not almost increase after a current exceeds a certain value. Rather, when flux collectors are not provided, the magnetic field tends to be strengthened. That is, the axial gap type superconducting motor 40 of this embodiment can realize high-output torque when the upper limit of a current can be set to a high value. Further, it is possible to reduce the weight of the motor as much as the flux collectors are not provided. The other parts of this embodiment are same as those of the first embodiment. Therefore, like reference numerals are given to the same parts as those of the first embodiment, and description thereof is omitted. Further, since basic conditions change in accordance with the presence or absence of flux collectors, the shapes of the coils also changes largely. It is noted that it is not described that the performance is changed in accordance with the presence or absence of flux collectors as the same coils are used.

In this embodiment, air gaps are provided in the hollow parts of the armature coils 17 and 19 of the stators 12 and 13. However, even when non-magnetic bodies such as FRP (Fiber Reinforced Plastics) or the like are disposed in the hollow parts as a modification of this embodiment, it is possible to obtain the same effects. Particularly when air gaps are not provided in the hollow parts but the non-magnetic bodies are disposed in the hollow parts, the coils are supported by the non-magnetic bodies such that attaching stability is enhanced.

Next, a fourth embodiment of the invention will be described.

A difference from the first embodiment is that the stators 12 and 13 are formed from FRP that is a non-magnetic body.

That is, the stators 12 and 13 are not formed from a magnetic body (such as iron) the weight of which is relatively heavy, but are formed from a light non-magnetic body such as resin or the like. Therefore, the weight of the motor can be reduced. Particularly, in many cases, a large-sized motor to be used for ships is configured as a series coupling synchronous motor in which rotors and stators are alternately disposed in an axial direction. Therefore, by reducing the weights of the respective stators 12 and 13, the weight of the motor can be significantly reduced. The effects are remarkably large. The other parts of this embodiment are the same as those of the first embodiment, and thus description thereof is omitted.

In this embodiment, the stators 12 and 13 are formed from FRP. However, the rotor 11 may be formed from FRP. Further, the configuration where the stators 12 and 13 and/or the rotor 11 are formed from non-magnetic bodies such as FRP can be applied to all the embodiments of the invention.

Next, a fifth embodiment of the invention will be described.

Figure 6:
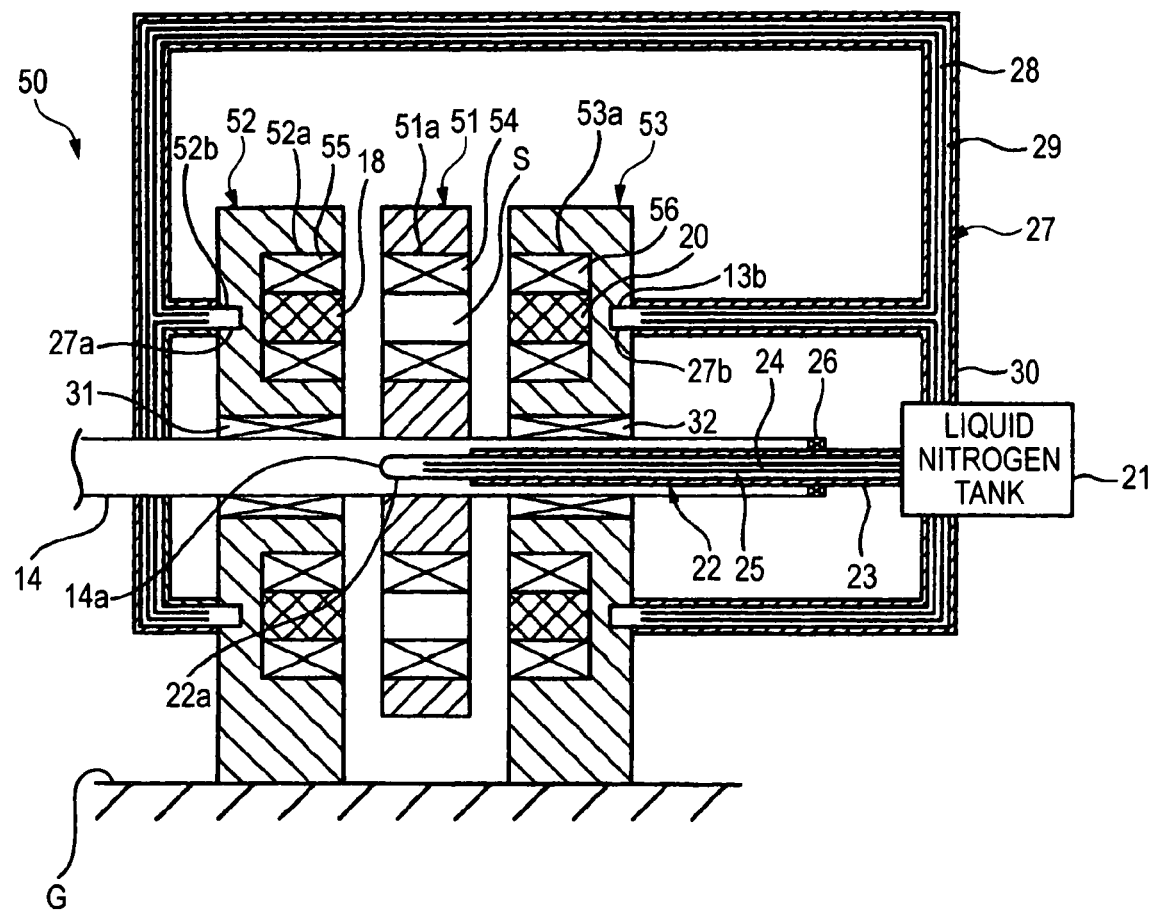
FIG. 6 is a sectional view of an axial gap type superconducting motor according to a fifth embodiment of the invention.

As shown in FIG. 6, differences from the first embodiment are that armature coils 54 made of a superconductive material are provided in a rotor 51, field coils 55 and 56 made of a superconductive material are provided in stators 52 and 53, and air gaps S are provided in hollow parts of the armature coils 54.

In this embodiment, the rotor 51 of the axial gap type superconducting motor 50 has a rotary shaft 14 fixed to the center thereof so as to pass through the center, a plurality of coil attachment holes 51a which are provided at regular intervals in the peripheral direction on the outer peripheral side of the rotor 51, and a plurality of armature coils 54 buried in the coil attachment holes 51a, the armature coils being made of a superconductive material. As such, the plurality of armature coils 54 are attached at regular intervals in the peripheral direction around the axis of the rotor such that the magnetic flux directions of the respective armature coils 54 are directed to the axial direction. The armature coils 54 are formed so as not to project from both side surfaces of the rotor 51. As a material for the rotor 51, a magnetic material, such as permendur, silicon steel, iron, or permalloy is used. Further, as a superconductive material for forming the armature coils 54, a bismuth-based or yttrium-based superconductive material is used. The respective armature coils 54 are configured so as to be supplied with required power from a power source (not shown).

The stators 52 and 53 have mutually symmetrical shapes. The stators 52 and 53 fixed to a ground surface G have a plurality of coil attaching concave parts 52a and 53a formed in the surfaces thereof facing the rotor, these coil attaching concave parts 52a and 53a being formed at regular intervals in the peripheral direction on the outer peripheral side. The plurality of field coils 55 and 56 made of a superconductive material are buried in the coil attaching concave parts 52a and 53a, respectively. As such, the plurality of field coils 55 and 56 are attached at regular intervals in the peripheral direction around the axis such that their magnetic flux directions are directed to the axial direction. In hollow parts of the respective field coils 55 and 56, flux collectors (magnetic bodies) 18 and 20 made of permendur are disposed. Any one of the flux collectors 18 and 20 and the field coils 55 and 56 are not made to project from the side surfaces of the stators 52 and 53. The field coils 55 and 56 are configured so as to be supplied with required power from a power source (not shown).

As a material of the stators 52 and 53, a magnetic material, such as permendur, silicon steel, iron, or permalloy, is used so as to fulfill a role as a back yoke. Further, as a superconductive material for forming the field coils 55 and 56, a bismuth-based or yttrium-based superconductive material is used.

The variations among the above-described embodiments, that is, the presence or absence of flux collectors in the coil hollow parts, the materials of the rotor and/or the stators and the like can also be applied to a case where the field coils 55 and 56 are provided in the stators 52 and 53 as in this embodiment.

Further, in this embodiment and the above-described third embodiment, any one of the rotor and the stators has magnetic bodies disposed in the coil hollow parts thereof. However, both of the rotor and the stators may have air gaps (or non-magnetic bodies such as FRP) formed in the coil hollow parts thereof, without the magnetic bodies.

Next, a sixth embodiment of the invention will be described.

Figure 7:
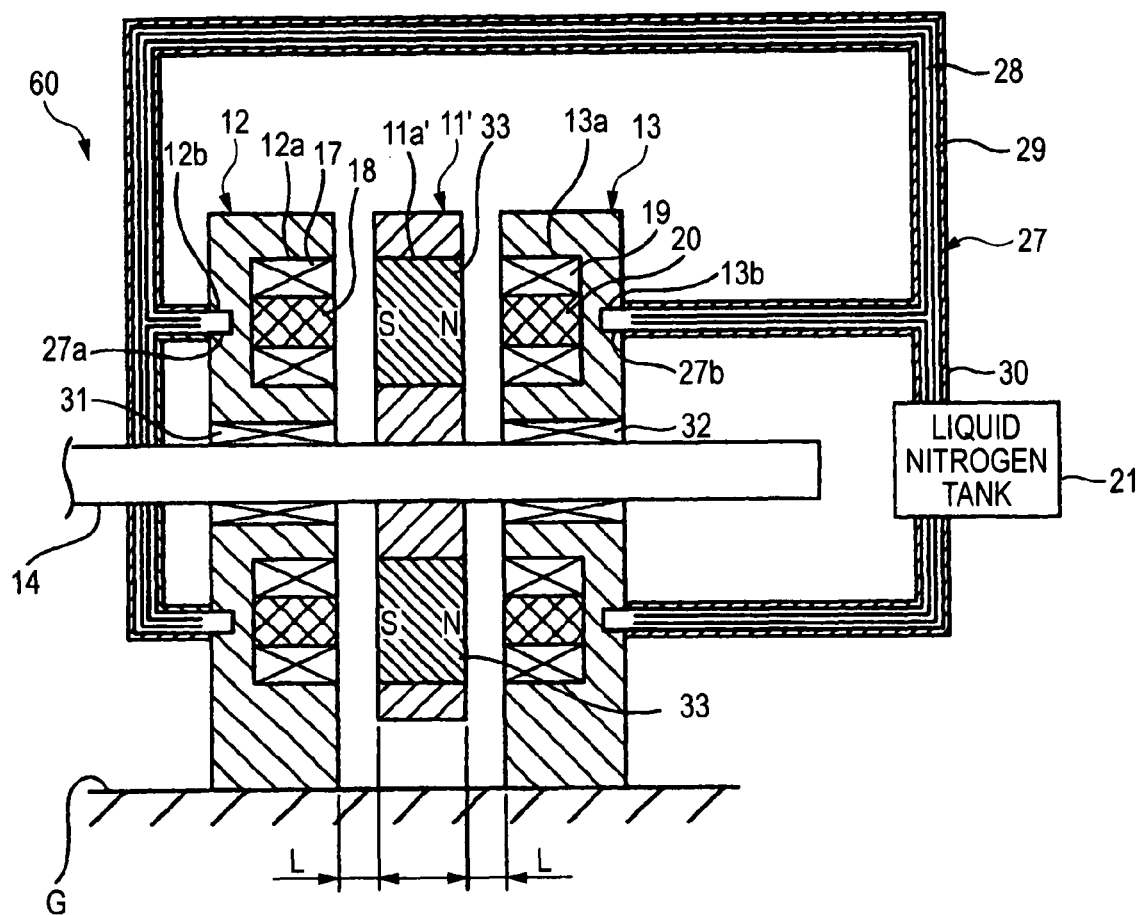
FIG. 7 is a sectional view of an axial gap type superconducting motor according to a sixth embodiment of the invention.

As shown in FIG. 7, a difference from the first embodiment is that permanent magnets 33 made of a material other than a superconductive material are used as the field bodies to be attached in a rotor 11'. The permanent magnets 33 are attached in a plurality of attachment holes 11a' which are provided in the rotor 11' at regular intervals in the peripheral direction of the rotor. In this case, the magnetic flux directions of the permanent magnets 33 are directed to the axial direction of the rotor 11'.

If this configuration is adopted, the permanent magnets 33 may be simply disposed in the rotor 11'. Therefore, the manufacturing efficiency of the axial gap type superconducting motor 60 improves. Further, a device for supplying power to the field bodies or a cooling structure is not needed, which makes it possible to simplify the structure of the motor.

Further, although the permanent magnets 33 are used as the field bodies, it is possible to sufficiently cope with any situation, if the output is 1 kW to 5 MW. Further, compared with when coils are used as the field coils 33 as in the first embodiment, it is possible to reduce the size of the motor.

The other parts and operational effects of this embodiment are the same as those of the first embodiment. Therefore, like reference numerals are given to the same parts as those of the first embodiment, and thus description thereof is omitted.

The configuration in which the field bodies are magnetic bodies, not coils, can be applied to the third to fifth embodiments.

INDUSTRIAL APPLICABILITY

The axial gap type superconducting motor according to the invention can obtain high output and reduce the size thereof. Therefore, the motor is suitably used as a driving motor for transportation vehicles, such as cars, trains, and ships. Particularly, the motor is suitably used as a propulsion motor of ships.

The invention claimed is:

1. An axial gap type superconducting motor, comprising:
   stators disposed with required air gaps in an axial direction of a rotor so as to face each other, each of the stators comprising a plurality of concave parts and the rotor defining a plurality of holes,
   a plurality of field bodies disposed within the plurality of concave parts or the plurality of holes around the axis of the rotor,
   a plurality of armature coils disposed within the other of the plurality of concave parts or the plurality of holes around the axis, wherein
   the field bodies and the armature coils are formed from a superconductive material such that the magnetic flux directions thereof are directed to the axial direction, and wherein air gaps are provided in hollow parts of the armature coils, or non-magnetic bodies are disposed in the hollow parts.

2. The axial gap type superconducting motor according to claim 1, wherein
   the field bodies are field coils; and
   both of the field coils and the armature coils are formed from a superconductive material.

3. The axial gap type superconducting motor according to claim 2, wherein
   air gaps are provided in hollow parts of the field coils, or non-magnetic bodies are disposed in the hollow parts.

4. The axial gap type superconducting motor according to claim 1, wherein
   the field bodies are permanent magnets, and
   the armature coils are formed from a superconductive material.

5. The axial gap type superconducting motor according to claim 1, wherein
   the stators are disposed on both sides of the rotor in the axial direction of the rotor,
   a rotary shaft fixed to the rotor is hung so as to pass through bearings of the stators, and
   the field bodies and the armature coils are disposed on the same axis with air gaps in the axial direction.

6. The axial gap type superconducting motor according to claim 5, wherein the field bodies are field coils and air gaps are provided in hollow parts of the field coils, or non-magnetic bodies are disposed in the hollow parts.

7. The axial gap type superconducting motor according to claim 1, wherein
   flux collectors of magnetic bodies are disposed in hollow parts of field coils serving as the field bodies and/or the armature coils.

8. The axial gap type superconducting motor according to claim 7, wherein
   the leading ends of the flux collectors are set in the same positions as the leading end surfaces of the coils where the flux collectors are disposed or in positions which recede from the leading end surfaces of the coils.

9. The axial type superconducting motor according to claim 7, wherein
   a material having at least one of high magnetic flux density and high magnetic permeability is used for the magnetic body.

10. The axial gap type superconducting motor according to claim 9, wherein
    the material having at least one of high magnetic flux density and high magnetic permeability is permendur.

11. The axial gap type superconducting motor according to claim 7, wherein
air gaps are provided in hollow parts of the field coils, or non-magnetic bodies are disposed in the hollow parts.

12. The axial gap type superconducting motor according to claim 1, wherein
the stators and/or the rotor is/are formed from a magnetic body.

13. The axial gap type superconducting motor according to claim 12, wherein
a material having at least one of high magnetic flux density and high magnetic permeability is used for the magnetic body.

14. The axial gap type superconducting motor according to claim 13, wherein
the material having at least one of high magnetic flux density and high magnetic permeability is permendur.

15. An axial gap type superconducting motor, comprising:
stators disposed with required air gaps in an axial direction of a rotor so as to face each other, each of the stators comprising a plurality of concave parts and the rotor defining a plurality of holes,
a plurality of field bodies disposed within the plurality of concave parts or the plurality of holes around the axis of the rotor,
a plurality of armature coils disposed within the other of the plurality of concave parts or the plurality of holes around the axis,
wherein the field bodies and the armature coils are formed from a superconductive material such that the magnetic flux directions thereof are directed to the axial direction,
wherein the field bodies are field coils; and both of the field coils and the armature coils are formed from a superconductive material; and
wherein air gaps are provided in the hollow parts of the field coils, or non-magnetic bodies are disposed in the hollow parts.

16. An axial gap type superconducting motor, comprising:
stators disposed with required air gaps in an axial direction of a rotor so as to face each other, each of the stators comprising a plurality of concave parts and the rotor defining a plurality of holes,
a plurality of field bodies disposed within the plurality of concave parts or the plurality of holes around the axis of the rotor,
a plurality of armature coils disposed within the other of the plurality of concave parts or the plurality of holes around the axis,
wherein the field bodies and the armature coils are formed from a superconductive material such that the magnetic flux directions thereof are directed to the axial direction,
wherein flux collectors of magnetic bodies are disposed in hollow parts of field coils serving as the field bodies and/or the armature coils; and
wherein air gaps are provided in hollow parts of the field coils, or non-magnetic bodies are disposed in the hollow parts.

* * * * *

UNITED STATES PATENT AND TRADEMARK OFFICE
CERTIFICATE OF CORRECTION

PATENT NO. : 7,872,393 B2
APPLICATION NO. : 11/793677
DATED : January 18, 2011
INVENTOR(S) : Toru Okazaki et al.

It is certified that error appears in the above-identified patent and that said Letters Patent is hereby corrected as shown below:

ON THE FRONT OF PATENT

Please correct the following:

Item (73) Assignees: Please change "Ishikawajima-Harima Heavy Industires Co., Ltd." to
-- Ishikawajima-Harima Heavy Industries Co., Ltd. --.

Signed and Sealed this
Third Day of May, 2011

David J. Kappos
*Director of the United States Patent and Trademark Office*